Oct. 2, 1945. J. JAMES 2,386,120
VEHICLE SIGNAL
Filed Feb. 3, 1943
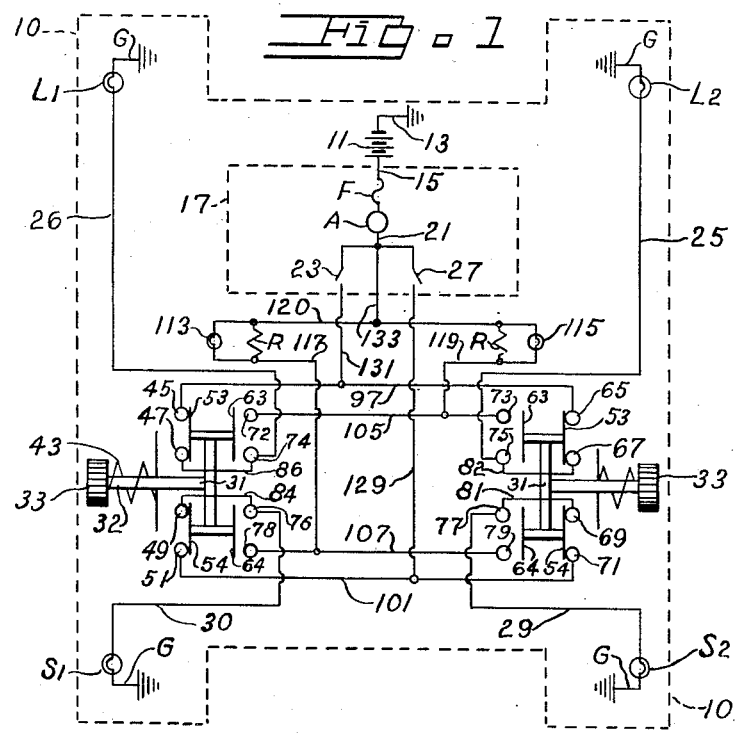
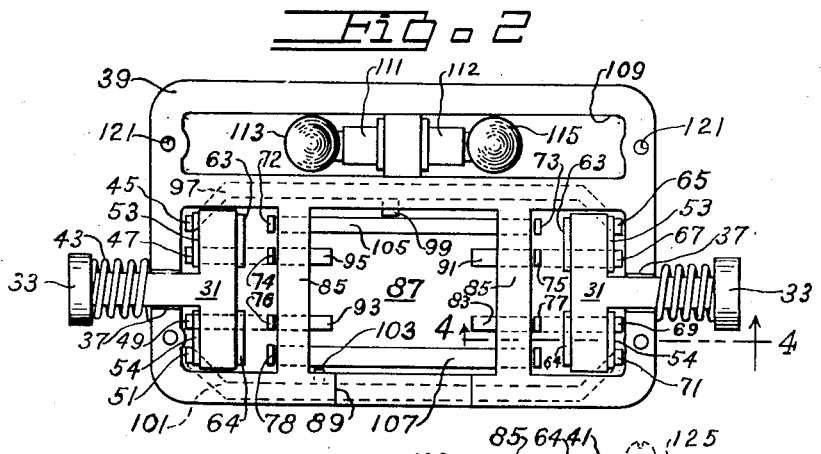
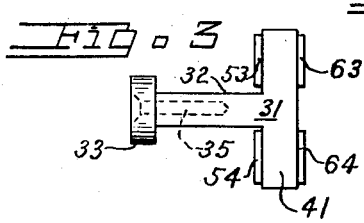
INVENTOR.
JOLLY JAMES
BY
F. T. Hicks
HIS ATTORNEY Patented Oct. 2, 1945

2,386,120

UNITED STATES PATENT OFFICE 2,386,120

VEHICLE SIGNAL

Jolly James, Melvindale, Mich.

Application February 3, 1943, Serial No. 474,516

6 Claims. (Cl. 177—337)

My invention pertains to driving signals and more particularly to improved signal circuits and switches for operating electrical signals on vehicles.

It is an object of my invention to provide vehicle driving signal systems of extreme simplicity utilizing to the greatest extent possible the regular equipment usually provided upon vehicles, and requiring the addition of a minimum amount of extra equipment of a rugged trouble-free nature.

It is also an object of my invention to provide simple and reliable signal systems for operating four signals on a vehicle comprising a pair of signals on the right-hand side of the vehicle and a pair of signals on the left-hand side of the vehicle, one signal of each pair being mounted upon a front portion of the vehicle and the other signal of each pair being mounted upon a rear portion of the vehicle.

It is a further object of my invention to provide such driving signal systems for vehicles wherein the four signals may be the regular lights usually provided such as the pair of parking lamps or the pair of headlights on the front of the vehicle and the pair of stop lights usually provided on the rear of the vehicle, and the signal systems being so arranged that these regular lights can still be utilized for the usual purposes for which they were originally provided.

Also, an object of my invention is to provide switch means especially for controlling the four signals of such signal systems and which are reliable and positive in operation, and of very simple construction requiring a minimum number of rugged interchangeable parts which are simple and convenient to manufacture, assemble and maintain.

Another object of my invention is to provide such a switch comprising a compact rugged arrangement housing operation indicating means for showing the operator whether the signal system is operating properly.

Further objects and advantages are within the scope of my invention such as relate to the arrangement, operation and function of the related elements, to various details of construction and to combinations of parts, elements per se, and to economics of manufacture and to numerous other features as will be apparent from a consideration of the specification in conjunction with the drawing disclosing embodiments of my invention, in which:

Fig. 1 is a diagrammatic view schematically representing a four signal vehicle system arranged in accordance with my invention;

Fig. 2 is a plan view of a compact simplified switch, and pilot means which I have provided for operating my signal system in conjunction with the regularly provided lights on a vehicle, the cover being removed to show the internal arrangement of the stationary contacts and the manually movable contactors;

Fig. 3 is a view of one of the T-shaped contactor members; and

Fig. 4 is a fragmentary sectional view taken on line 4—4 in Fig. 2, and partially broken away.

Referring more specifically to Fig. 1 of the drawing, my improved vehicle signal system utilizes two signals $L_1$ and $L_2$ which may preferably be the two parking or fender lights, or which may be the two headlights, mounted upon the front portion of the vehicle. Two signal devices $S_1$ and $S_2$ are preferably the two "stop" lights usually provided as standard equipment upon automobiles, one being mounted adjacent or on each fender of the vehicle 10 represented by dotted lines. Although it is usually more convenient and economical to utilize the regular equipment on the vehicle, it is also apparent that my simplified signal system may also be advantageously utilized in combination with especially provided signal lamps or devices, which may be added on the vehicle if desired.

A storage battery, as represented at 11, is also usually provided as standard equipment. One terminal of the battery is usually grounded, as by a ground connection 13, which may be connected to the chassis of the vehicle. From the other terminal of the battery 11 a circuit usually extends, as by way of a conductor 15, a fuse or other current limiting safety device F, thence through an ammeter A, which may be mounted upon an instrument board 17, shown dotted, and continuing by a conductor 21 to supply the various electrical appliances and lights on the vehicle. The conductor 21 connects with one terminal of a switch 23 the other terminal of which usually (but not here) connects with two conductors 25 and 26 which extend to the ungrounded terminals of the lamps $L_2$ and $L_1$, respectively. Also, the conductor 21 connects with one terminal of the usual brake operated switch 27. Usually the other terminal of this switch connects directly with two conductors 29 and 30 which extend to the ungrounded terminals of the two stop lights $S_2$ and $S_1$ respectively, but this connection is modified in my system.

For manually controlling the operation of my signal system, I provide simple compact switch means, which is shown in Figs. 2, 3 and 4, and which is represented diagrammatically in Fig.

1. My signal switch comprises a pair of manually actuatable members of any suitable form projecting in suitably spaced relation to be conveniently gripped by the thumb and forefinger of one hand of the operator for simultaneous, selective, or rapid intermittent operation. Although the manually actuable members may be spaced in other convenient relations, I have in the embodiment shown in Figs. 1, 2, 3 and 4, provided these as T-shaped contactors 31 movably disposed with the stems 32 projecting outwardly in opposite directions and provided with knobs 33 secured on the outer ends, as by screws 35. The stems of the T-shaped contactors pass slidably through suitable openings 37 provided in the opposite ends of a switch casing 39 wherein the bars 41 of the contactors are movably disposed. Resilient biasing means is provided for continuously urging the T-shaped contactors 31 to move outwardly, which may be conveniently accomplished by providing a compression spring 43 concentrically disposed on the stem 32 of each contactor where it reacts between the outer end of the switch casing and the knob on the end of the stem of the contactor. To provide for convenient one handed operation, the overall dimensions of the switch casing 39 and the projecting knobs 33 is so selected so as to be within the span of the thumb and forefinger of one hand.

Pushing the knobs or buttons 33, will flash the lights as signals either as a pair on the left-hand or on the right-hand side, or altogether simultaneously, even though either or both the stoplight switch 27 or the parking-light switch 23 are closed, by transferring the connections from normal to signal control. Normal circuits are completed by providing an outer set of four contacts 45, 47, 49 and 51 disposed for engagement by the outer side of the bar 41 of the left-hand T-shaped contactor 31. The outer side of the bar 41 of the contactor is provided with two metallic bridging contacts 53 and 54 mounted thereon in spaced insulated relation on opposite sides of the stem for conductively bridging the stationary outer set of contacts, together in two pairs 45, 47 and 49, 51 as the contactor is held normally in its outermost position by the spring 43.

Mounted in spaced relation from the inside of the bar 41 of the left-hand contactor is another set of stationary contacts consisting of a pair of contacts 72 and 74 on one side of the center and a pair of contacts 76 and 78 on the other side of the center of the bar. The inner side of the contactor bar 41 is provided with two bridging contacts 63 and 64 mounted thereon in spaced insulated relation, suitably positioned to bridge the adjacently disposed stationary pairs of contacts when the contactor is manually depressed to also simultaneously open the connections through the outer set of stationary contacts. The right-hand T-shaped contactor member 31 is similarly provided with two bridging contacts 53 and 54 mounted on the outer side of the bar and two bridging contacts 63 and 64 mounted on the inner side of the bar, suitably spaced and insulated.

For convenience in mounting and insulating the bridging contacts the T-shaped contactors 31 may be made of some electrical insulation material such as Bakelite, hard rubber or some other suitable plastic material. Being similar in shape and construction the contactors are interchangeable which avoids risk of incorrect assembly by installer or operator.

Mounted adjacent the right-hand contactor for engagement by the two outer bridging contacts 53 and 54 are stationary pairs of contacts 65, 67 and 69, 71 respectively. And slightly spaced inwardly from the two inner bridging contacts 63 and 64 of the right-hand contactor are two pairs of stationary contacts 73, 75 and 77, 79 respectively, which are simultaneously bridged when the right-hand contactor is depressed inwardly.

The switch casing 39 is made of any suitable electrical insulation material such as a phenolic condensation product, or any suitable plastic composition material, for firmly supporting the bases of the stationary contacts imbedded therein with the ends rising freely therefrom to cooperate as resiliently engageable contacts when abutted by the bridging contacts carried on the movable T-shaped contactor members, as may be seen with reference to contacts 69 and 77 in Fig. 4, for example. Also as may be seen in Fig. 4, stationary contact 69, of the right-hand outer set of contacts, is permanently connected with the contact 77 of the inner set of contacts through a conductive strip of metal 81 (Figs. 1 and 4) which is imbedded in the insulation material of the bottom wall of the switch casing 39 and connects between the embedded ends of the two contacts. The contacts 69 and 77 and all the stationary contacts rise from the base of the switch casing in suitable spaced relation from the walls of the casing to permit some resilient movement when engaged by the bridging contacts. A lug 83 projects inwardly into the casing from the contact 77 for convenient connection, as by soldering to the wire 29 extending to the stop light $S_2$ on the right-hand side of the vehicle. Partitions 85 are provided within the switch casing 39 inside of the two inner sets of stationary contacts for enclosing a wiring compartment 87 where the ends of the wires of the circuits may be inserted for connection with the contact lugs without danger of interfering with the operation of the contacts. An opening 89 is formed in one side of the casing for receiving the wires.

The stationary contacts 67 and 75 are also similarly connected permanently by a metallic strip 82 (shown dotted Fig. 2 and reference character in Fig. 1) embedded in the bottom of the switch casing, and a wiring lug 91 projects therefrom into the wiring compartment. At the left-hand end of the switch casing the two contacts 49 and 76 are permanently connected through an embedded strip 84, and a wiring lug 93 projects into the wiring compartment. Also the two contacts 47 and 74 are permanently connected through an embedded strip 86 and a lug 95 projects in the wiring compartment. The two outer contacts 45 and 65 are permanently connected through an embedded strip 97 (shown dotted) and having a wiring lug 99 projecting into the wiring compartment. The two outer contacts 51 and 71 are permanently connected through an embedded strip 101, having a lug 103 projecting into the wiring compartment. Of the inner sets of contacts; two contacts 72 and 73 are permanently connected through a metal bar or strip 105 passing through the wiring compartment for convenience in wiring. Also the two contacts 78 and 79 are similarly connected through a strip 107 passing through the wiring compartment.

An operativeness indicator compartment 109 is provided along one side of the switch casing having two small sockets 111 and 112 suitable for receiving small incandescent electric bulbs 113 and 115. For this purpose any suitable pilot bulbs may be used, but for convenient availability and compactness I prefer to utilize flashlight bulbs with shunt resistances R suitable to carry most of the current of the circuit and providing just enough resistance drop to apply a voltage, less than normal operating voltage, on the terminals of the bulbs sufficient to cause these to glow when either circuit is operating, and brighter when both circuits are operating, to be subsequently more fully set forth. As represented in Fig. 1, one terminal of the lamp 113 and one end of one shunt resistor R are connected by a conductor 117 with strip 107 in the switch. The other lamp 115 has one side and also one end of the outer shunt resistor R connected permanently by a conductor 119 to the strip 105 in the switch. The other terminal of both lamps 113 and 115 and of both shunt resistors R are connected by a conductor 120.

Holes 121 are provided through the switch casing for passing fastening screws 123 through to secure a cover 125 on the casing, as represented by dotted lines in Fig. 4. Also the same screws 123 secure the casing to any suitable clamp or bracket 127 for mounting the switch casing.

Installation of my signal switch on a vehicle, for utilizing the regular cowl or head lights $L_1$ and $L_2$ and the stop lights $S_1$ and $S_2$, is conveniently accomplished by mounting the switch casing bracket 127 either on the gear shift lever, the steering column or instrument board or in any other suitably convenient position, as preferred by the operator. The button 33 which signals a left turn may be positioned toward the left. The cowl or head light conductors 25 and 26 are detached from the regular switch 23 and these wires are inserted through the opening 89 into the wiring compartment 87 in the signal switch where safe and permanent connections are established, as by soldering conductor 25 to the wiring lug 91 of contacts 67 and 75 and conductor 26 to the wiring lug 95 of contacts 47 and 74, as represented in Fig. 1. Conductors 29 and 30 are similarly detached from their normal brake actuated control switch 27 and are connected with pairs of contacts 69, 71 and 49, 76 respectively by soldering to lugs 83 and 93 of my control switch. From the interconnecting strip 101, connecting between contacts 51 and 71 in my switch, a conductor 129 is connected extending back to the previously disconnected terminal of the stop light control switch 27. From contacts 45 and 65 in my switch, a conductor 131 is connected to the disconnected terminal of the regular cowl light control switch 23. From the conductor 120, connecting the operativeness indicators, a conductor 133 is connected to the conductor 21 on the instrument board.

The cowl, or head-lights $L_1$ and $L_2$, and also the stop lights $S_1$ and $S_2$, may still be utilized in a normal manner. Closing the switch 23 normally completes a circuit from one side of the battery 11 through both of these lights for regular operation in the usual manner.

The normal control circuit for the light $L_1$ may be traced in Fig. 1 from the ungrounded terminal of the battery 11 by way of the conductor 15, fuse F, ammeter A, conductor 21, switch 23, conductors 131 and 97, switch contacts 45, 53 and 47 (held closed by spring 43), strip 86, contact 74, and conductor 26 to the ungrounded terminal of lamp $L_1$. For the other lamp $L_2$ the normal control circuit is as above traced to conductor 97, thence by way of the switch contacts 65, 53 and 67 (held closed by the spring) and through strip 82 to contact 75 and conductor 25 to the ungrounded terminal of the lamp $L_2$. And from the stop light switch 27 a normal control circuit extends by way of conductors 129 and 101, switch contacts 51, 54 and 49 (normally closed by spring 43) strip 84, contact 76, and conductor 30 to the ungrounded terminal of "stop" light $S_1$. Also conductor 101 connects through the switch contacts 71, 54 and 69 (normally closed by the other spring) thence by way of conductive strip 81 and conductor 29 to the ungrounded terminal of the other "stop" light $S_2$.

In operation, the operator of the vehicle equipped with my driving signal system finds it convenient to quickly grip the knobs or buttons 33 of the signal switch with the thumb and forefinger of one hand whenever he wishes to produce a distinctive signal indicating his intentions to the drivers of other vehicles. If he wishes to indicate that he intends to "make a left turn" he intermittently depresses and releases the button 33 which intermittently energizes and flashes the pair of lights $L_1$ and $S_1$ on the left-hand side of the vehicle. The light flashes produce a signal which will quite definitely indicate to other drivers that a left-turn is about to be made. Such a signal is very clear and noticeable to the drivers of vehicles approaching from in front as well as to those following from behind. Simultaneously the operativeness bulbs 113 and 115 are flashed to show the operator if the signals $L_1$ and $S_1$ are operating, and these operativeness indicators are conveniently viewed through windows 126 in the cover 125, shown dotted Fig. 4.

The signal control circuit for flashing the lamp $S_1$ may be traced in Fig. 1 from the ungrounded terminal of the battery 11 by way of conductor 15, fuse F, ammeter A, conductors 21, 133 and 120, operativeness indicator bulb 113 and its shunt resistor R, conductors 117 and 107, switch contacts 78, 64 and 76 (normally open, but closed temporarily by the operator), thence by way of conductor 30 to the ungrounded terminal of "stop" light $S_1$. The signal control circuit for the left-hand lamp $L_1$ on the front of the vehicle is from the battery to conductor 120, as traced above, through operativeness bulb 115 and its shunt resistor R, conductors 119 and 105, switch contacts 72, 63 and 74 (closed temporarily by the operator) and thence through conductor 26 to lamp $L_1$.

It is to be observed that even if either normal control switch 23 or 27 had been previously closed, control would have been transferred to the signal circuits, as above traced. This is accomplished by bridging contact 53, carried by the T-shaped contactor, moving away from contacts 45 and 47, and bridging contact 54 moving away from contacts 49 and 51; when the bridging contactors 63 and 64 are moved into engagement with the adjacent stationary contacts for establishing the signal circuits.

A right-turn is signalled by depressing the other button 33 which flashes the lights $L_2$ and $S_2$ on the right-hand side of the vehicle, irrespective of the position of the regular control switches 23 and 27. The operativeness bulbs 113 and 115 are also flashed to indicate to the operator if the respective signals $S_2$ and $L_2$ are operating.

Depressing the right-hand button 33, as from in Fig. 1, moves the T-shaped contactor into the casing and carries bridging contacts 53 and 54 in away from the stationary contacts 65, 67, 69 and 71, through which the regular control circuits were normally maintained as previously described, and simultaneously moves the bridging contacts 63 and 64 into engagement with the pairs of contacts 73, 75 and 77, 79 for completing signal control circuits to the lights $L_2$ and $S_2$ on the right-hand side of the vehicle, similarly as depressing the left-hand button completed the circuits for the other lights $L_1$ and $S_1$, the arrangement of the contacts and connections being symmetrical on both sides, as shown in Fig. 1. The inner contacts 72, 74, 76, 78, 73, 75, 77 and 79 I term "signal contacts."

Using both buttons, which are arranged to be conveniently gripped by the thumb and fingers of one hand, will light all four lights, which may be flashed to signal a stop or to warn drivers to be alert for some abnormal condition such as a quick stop, a patch of ice on the highway, or any hazardous circumstance.

A code of signals may be adopted whereby operation of my simple signal system may transmit a wide range of information to other drivers and also to pedestrians. Flashing all signals; one flash may mean "stop"; two flashes may mean "go"; three flashes may mean "back up." Lighting all four lights after starting a turn may mean "I will stop, pedestrians may proceed, drivers in rear stop." Two flashes on right may mean "I wish to move over to right for some purpose" or similarly to the left with the left hand signals. Successive long flashes on right may mean "I will pull in and stop to park." When parked, two flashes on left may mean "I am pulling out forward," and three flashes on the left may mean "I am backing out." Two flashes when starting turn may signal waiting pedestrians that driver will proceed. When confronted by a driver desiring a left turn: one long flash may signal the other driver to proceed; same for side street; two flashes may mean "I intend to proceed." When standing still, four short flashes may mean "I can't get started, please give me a push."

Although I have shown and described certain specific embodiments of my invention I am fully aware that many modifications thereof are possible. My invention, therefore, is not to be restricted except insofar as necessitated by the prior art.

I claim:

1. A vehicle signal system comprising, a vehicle, four electric lights one being mounted adjacent each fender of the vehicle, a source of electrical energy, conductors, a conventional switch and connections for simultaneously energizing the two forward lights, a conventional switch and connections for simultaneously energizing as a pair the two rearward lights, such previously mentioned elements being standard equipment as regularly provided on vehicles, two operativeness indicating devices, and signal switch means having contacts and connections normally maintaining control of said lights through said regular switches and adapted for actuation to take control for simultaneously flashing either the two lights on the right-hand side of the vehicle with both indicating devices, flashing the two lights on the left-hand side of the vehicle with both indicating devices, or to flash all four of said lights with said indicating devices and thereafter to restore control to the regular switches.

2. In combination in a vehicle driving signal system, four regular equipment electric vehicle lights, said lights being arranged one each respectively on the left hand side of the front end of a vehicle, the right hand side of the front end, the left hand side of the rear end and the right hand side of the rear end in a manner usual with the externally exposed lights on a vehicle, a source of electrical energy, a conventional switch and circuits for energizing the two front end lights simultaneously from said source, a conventional switch and circuits for simultaneously energizing the two rear end lights from said source, signal switch means adapted to take control for simultaneously flashing the two lights on the right hand side of the vehicle, or the two lights on the left hand side of the vehicle, or for flashing all four lights and thereafter restoring control to the conventional switches, said signal switch means comprising a movable left hand signal contactor, four stationary contacts adjacent said contactor, two bridging contacts mounted insulated apart on said contactor for engaging and bridging said stationary contacts as two pairs when the contactor is moved to an extreme position, means biasing said contactor normally to said extreme position, the conventional energizing circuits of the left hand front and rear lights each being connected through a separate pair of said pairs of normally bridged contacts, a second set of stationary contacts adjacent said contactor, conductive means connecting respective ones of the second set of contacts to the other terminal of said source and to the conventional energizing circuits of said front and rear left hand lights, bridging contact means on said contactor for engaging said second set of stationary contacts and energizing the front and rear left hand lights when said contactor is moved away from said extreme position opening the conventional energizing circuits, a movable right hand signal contactor, four stationary contacts adjacent said right contactor, two bridging contacts mounted insulated apart on said right contactor for engaging and bridging said stationary contacts as two pairs when said contactor is moved to an extreme position, means biasing said right contactor normally to said extreme position, the conventional energizing circuits of the right hand front and rear lights each being connected through a separate pair of said pairs of normally bridged contacts, a second set of stationary contacts adjacent said right contactor, conductive means connecting respective ones of the second set of contacts to said other terminal of said source and to the conventional energizing circuits of said front and rear right hand lights, and bridging contact means on said right contactor for engaging said adjacent second set of stationary contacts and flashing the front and rear right hand lights when said right contactor is moved away from said extreme position opening the conventional energizing circuits of the right hand lights.

3. A vehicle signal system in accordance with claim 2 and further characterized by said movable contactors being disposed for convenient one handed operation, either singly or together.

4. A vehicle signal system in accordance with claim 2 and further characterized by having two operativeness indicating devices, one of said operativeness devices being connected into the circuit from said other terminal of the source to certain contacts in the second sets of stationary contacts, and the other indicator being connected into the circuit connecting from said other terminal of the source to other contacts in second set of stationary contacts.

5. A vehicle driving signal system comprising, a source of electrical energy, four electric lights, one of said lights being for the left hand side of the front end of a vehicle, another for the right hand side of the front end and the other two being for the right and the left hand sides of the rear end in the manner usual with the externally exposed lights of a vehicle, electrical conductive means connecting one terminal of said source with one terminal of each of the electric lights, a conventional switch and circuits to connect the other terminal of said source to the other terminals of the two front lights for the usual simultaneous operation thereof, a conventional switch and conductive means for simultaneously connecting said other terminal of said source with the other terminals of the two rear lights in a usual manner, signal switch means for taking control from the conventional switches to simultaneously flash the two lights on the left hand side or the two lights on the right hand side or to flash all four lights, said signal switch means comprising, two outer sets of four contacts, two inner sets of four contacts between said outer sets and spaced therefrom, a pair of movable contactors, one of said contactors being disposed between each outer set of contacts and the inner set of contacts spaced therefrom for movement to engage either set of contacts, four electrically conductive bridging contacts supported in insulated relation on each contactor for bridging the stationary contacts in pairs when either contactor is moved to either extreme position engaging either the inner or the outer set of spaced contacts between which it moves, means biasing each contactor to normally rest in engagement with the adjacent outer set of contacts, conductive means connecting one of each bridgable pair of contacts in each outer set into the normal energizing circuit of one of said lights, conductive means connecting said other terminal of said source to one of each of the bridgable pairs of contacts of said inner sets of contacts, and conductive means connecting the other one of each bridgable pair of inner contacts to the other one of a corresponding bridgable pair of outer contacts and to said other terminal of one of the lights respectively.

6. A vehicle driving signal system in accordance with claim 5 and further characterized by said movable contactors being disposed for convenient one handed operation, either singly or simultaneously.

JOLLY JAMES.